UNITED STATES PATENT OFFICE.

CHARLES P. MEBANE, OF CLEVELAND, OHIO, ASSIGNOR TO THE CARBONIZING ENGINEERING COMPANY, A CORPORATION OF OHIO.

COMPOSITION FOR CASE-HARDENING.

1,312,339.

Specification of Letters Patent.

Patented Aug. 5, 1919.

No Drawing. Application filed December 24, 1914. Serial No. 878,972.

*To all whom it may concern:*

Be it known that I, CHARLES P. MEBANE, a citizen of the United States, residing at Cleveland, in the county of Cuyahoga and State of Ohio, have invented a certain new and useful Improvement in Composition for Case-Hardening, of which the following is a full, clear and exact description.

This invention relates to processes for carburizing steel and has for its general object to accomplish this result in a particularly economical and efficient manner; also to provide a composition of matter whereby the process may be realized.

The carburizing operation as ordinarily conducted consists generally in making a mixture of charcoal and a carbonate (such as sodium carbonate, calcium carbonate, barium carbonate, ammonium carbonate, etc.,) and in embedding the article to be carburized in this mixture and subjecting the article and the mixture to a temperature which will result in adding to the article the amount of carbon necessary to secure the desired degree of hardness in the outer film or layer of the metal after quenching. At the end of the carburizing operation, the greater portion of the charcoal is left unconsumed and may be used in the succeeding operations. However, the carbonate will be present in insufficient quantity to secure a maximum efficiency in the succeeding uses of the mixture, and this efficiency will be lowered progressively through subsequent successive operations. It has been attempted to correct this decreasing efficiency by adding a fresh supply of carbonate to the mixture after each carburizing operation. This, however, has been attended with the serious objection that the metal thus treated is very apt to be pitted, or spotted, and that the carburizing is not uniform throughout the article treated.

It has also been proposed to make a mixture of charcoal and carbonate in proper proportions and to keep this mixture on hand. This, however, has been attended with the objection that the agitation of the mixture (as through the shaking or jarring of the building by the operation of machinery, etc.,) even though slight, is sufficient to separate the heavier carbonate from the lighter charcoal, with the result that the mixture does not remain homogenous, the carbonate accumulating at the lower part or bottom of the receptacle containing the mixture while the charcoal at the upper part of said receptacle will in time have practically no carbonate mingled therewith.

It is the purpose of this invention to improve the process of carburizing so as to overcome the objections noted hereinbefore, while securing a uniform maximum efficiency in each carburizing operation; also to secure these results in a simple and particularly economical manner.

In carrying out my invention I take a quantity of charcoal suitable for a day's work in the particular plant wherein the process may be carried on, said charcoal being preferably known to the trade as "Number 4," charcoal—the charcoal being of a size which will permit it to pass through a screen having four meshes to the linear inch. Assuming the charcoal to compose one hundred parts by weight of the case-hardening mixture, I take a quantity of sawdust (or other carbonaceous material) constituting from three to thirty-five per cent. of the weight of charcoal (or other carbonaceaus material) but preferably constituting from five to fifteen per cent of such weight and add to this charcoal a quantity of carbonate (as sodium carbonate). For the purpose of securing a proper mixture, I either use moist sawdust (or other carbonaceaus material)—fresh sawdust from a mill will frequently possess sufficient moisture for the purpose—and mingle the carbonate therewith. In the event that the sawdust is dry, I moisten the same before adding the carbonate thereto or I may mingle the carbonate with the sawdust and sprinkle this mixture, or otherwise moisten the mixture, the purpose of the moisture being to dissolve the carbonate whereby it will penetrate the pores of the sawdust and form a coating with the sawdust. The proportion of carbonate employed is from three to thirty-five per cent. by weight of the charcoal. By this means, an extremely uniform mixture of sawdust and carbonate is secured. I then add the mixture thus produced to the charcoal or other carbonaceous material, such as cottonseed meal, and mix the same therewith as intimately and as uniformly as possible.

At the end of the day's work (or rather, at the end of a carburizing operation) a considerable quantity of the charcoal will be left. The sawdust or the carbonaceous materials have been substantially consumed, leaving the carbonate in a partly spent and finely divided condition. If this mixture of charcoal and carbonate be used again, the metals treated thereby will not be as effectively carburized as in the preceding work when the carbonate was in a fresh condition. Furthermore, the scale of efficiency of the resultant mixture will diminish from day to day (or from operation to operation) with a corresponding diminution in the efficiency of the carburizing accomplished therewith. This condition cannot be corrected, as a commercial proposition, by adding fresh carbonate (either alone or mingled with the sawdust) as the mixing of the fresh carbonate with the partly spent carbonate results, after several operations, in spotting or pitting the articles to be carburized, as well as in lack of uniformity in the carburizing of the articles. This detrimental action is believed to be due to the chemical changes which have been produced in the original carbonate whereby this partly spent materal does not form a working mixture with the fresh carbonate.

In order to utilize the charcoal and at the same time secure the maximum efficiency in the subsequent re-use of the same, after a day's work (or the particular job of carburizing) has been completed, I sieve the mass of charcoal and carbonate, using preferably a 1/64 inch mesh sieve. A sieve of this fineness will separate the partly spent carbonate from the charcoal. I can then add to this charcoal the proper proportion by weight of the mixture of sawdust and carbonate and obtain as great efficiency in the next carburizing operation as in the first.

In the claims hereto appended I employ the term "finely divided" in connection with the carbonaceous material additional to or in place of the charcoal. This term is meant to include carbonaceous material of such fineness as will enable it to be practically all consumed during carburizing operation, leaving the largest portion of carbonate free to pass through the meshes of the separating sieve.

By this process and the carburizing composition employed, the charcoal may be reused until completely consumed and with no substantial waste of material, the carbonaceous material and spent carbonate which are discarded being extremely cheap.

Having thus described my invention, what I claim is:

1. A composition of matter for the purpose specified comprising a mixture of charcoal and sawdust impregnated and coated with a carbonate, the ingredients being mingled in about the following proportions:

Charcoal, 100 parts by weight.
Sawdust, 3 to 35 parts by weight.
Carbonate, 3 to 35 parts by weight.

2. A composition of matter for the purpose specified comprising a mixture of granular charcoal with carbonaceous vegetable material impregnated and coated with a carbonate, the ingredients being mingled in about the following proportion:—

Charcoal, 100 parts by weight.
Vegetable carbonaceous material, three to thirty-five parts by weight.
Carbonate, three to thirty-five parts by weight.

3. A composition of matter for the purpose specified comprising a mixture of granular charcoal with sawdust impregnated and coated with a carbonate, the ingredients being mingled in about the following proportions:

Charcoal, 100 parts by weight.
Sawdust, 10 parts by weight.
Carbonate, 10 parts by weight.

In testimony whereof, I hereunto affix my signature in the presence of two witnesses.

CHARLES P. MEBANE.

Witnesses:
 HUGH B. MCGILL,
 BRENNAN B. WEST.

Copies of this patent may be obtained for five cents each, by addressing the "Commissioner of Patents, Washington, D. C."